United States Patent [19]

Schreiner et al.

[11] 3,863,337
[45] Feb. 4, 1975

[54] POWDER METALLURGY METHOD FOR MAKING AN ELECTRIC CONTACT AND THE RESULTING CONTACT

[75] Inventors: Horst Schreiner; Bernard Rothkegel, both of Nurnberg, Germany

[73] Assignee: Siemens Aktiengesellschaft, Munich, Germany

[22] Filed: Aug. 24, 1972

[21] Appl. No.: 283,408

[30] Foreign Application Priority Data
Sept. 1, 1971 Germany............................ 2143843

[52] U.S. Cl................ 29/630 C, 29/630 R, 200/264
[51] Int. Cl................................................ H01r 9/00
[58] Field of Search............ 29/420, 420.5, DIG. 31, 29/628, 629, 630 R, 630 A, 630 B, 630 C, 29/630 D; 200/166 C, 166 CM, 166 F

[56] References Cited
UNITED STATES PATENTS

| | | | |
|---|---|---|---|
| 2,641,670 | 6/1953 | Graves............................ | 200/166 C |
| 2,694,126 | 11/1954 | Binstock........................ | 200/166 C |
| 3,143,626 | 8/1964 | Schreiner et al............... | 200/166 C |
| 3,226,517 | 12/1965 | Schreiner...................... | 200/166 C |
| 3,254,189 | 5/1966 | Evanicsko et al.............. | 200/166 C |
| 3,359,623 | 12/1967 | Gwyn.............................. | 29/630 C |
| 3,511,953 | 5/1970 | Schmidt.......................... | 200/166 C |
| 3,610,859 | 10/1971 | Schreiner et al............... | 200/166 C |

*Primary Examiner*—C. W. Lanham
*Assistant Examiner*—James R. Duzan
*Attorney, Agent, or Firm*—Kenyon & Kenyon Reilly Carr & Chapin

[57] ABSTRACT

A layer of refractory metal or metal compound powder and a layer of low temperature melting metal or metal alloy powder are arranged together in the cavity of a compacting die and consolidated together to form an integrated two-layer compact which is thereafter heated above said low temperature but below the refractory powder's sintering temperature to cause the pores of the compact's refractory portion to be impregnated with the low temperature melting component while leaving an excess thereof forming a thin layer on the refractory portion. Because the two layers of the compact are consolidated together so that the compact may be moved safely without the layers separating during the heating, the use of a continuous furnace for the heating is commercially practical, and because the refractory portion is not sintered, the finished product's dimensions can be accurately predetermined by the compacting die cavity dimensions. By heating the compact with its low temperature melting end down and resting as a refractory carrier surface having a plurality of depressions beneath this end, said layer is formed with a smooth exposed surface suitable for soldering or welding to a supporting metal part. Thus, a finished electric contact, for example, may be produced by the two steps of compacting and heating only, having a thick contact layer resistant to arc burning and contact welding trouble and a thin support layer that is solderable or weldable to a metal support or operating element.

4 Claims, 14 Drawing Figures

POWDER METALLURGY METHOD FOR MAKING AN ELECTRIC CONTACT AND THE RESULTING CONTACT

BACKGROUND OF THE INVENTION

This invention relates particularly to electric contacts made by powder metallurgy methods, such as contacts for electric power circuit breakers and the like. Such a contact should resist burning by the electric arc which forms between it and a cooperating contact when the two contacts separate. It should have the lowest possible welding tendency when subjected to such conditions; and when closed with the other contact, it should have a low contact electric resistance to avoid heating while continuously carrying electric power, keeping in mind that such contacts are enclosed by a housing made of insulating material which is not highly heat resistant.

In addition, the contact preferably should be solderable or weldable to the metal part which supports or actuates the contact; and the contact should be capable of being manufactured economically in large quantities by an uncomplicated manufacturing method capable of high production rates.

To achieve a low order of burn-off caused by arcing, the contact should be made of a material of very low or non-existing porosity.

DESCRIPTION OF THE PRIOR ART

It is known that an electric contact may be made by compacting two different metal powder layers and the resulting two-layer compact sintered by using temperatures below the melting temperature of the metal powder comprising both layers, but high enough to sinter the powder particles together, the result being a two-layer sintered contact. However, the interlocking strength of the two sintered metal powder layers depends on the powder paricle sizes involved.

Furthermore, it is common to make a contact by first making a sintered metal powder porous body by sintering a refractory metal or metal compound powder compact; and as a second step, to thereafter impregnate its pores with a molten low temperature melting metal, such as copper or silver, in a separate heating operation. But for impregnation, the sintered body must be balanced on the low temperature melting metal, this resulting in an undesirably large number of faulty contacts when using a continuous furnace through which the two pieces must be moved with some attendant vibration of necessity. Mechanical holding means for the two pieces are not reliable. Also, only a single layer contact can be produced because an excess of the impregnating metal forms an irregular mass which must be removed by machining or the like.

German published Pat. application No. 2,018,642 provides the suggestion that to reduce the labor and time required by the above two-step practice, a two-layer compact may be formed, one layer comprising the refractory powder, and the other the low melting temperature metal powder. This compact is heated to a temperature above the melting temperature of the layer comprising the relatively lower melting temperature metal powder so that the latter becomes molten and impregnates the pores of the other layer. This published technique is inadequate to solve the problem that if an excess of the impregnating metal powder is used, after heating this excess is in the form of an irregularly adhering mass which must be machined or otherwise worked, this representing a postsintering treatment with its incidental time consumption and expense. Therefore, only single-layer products can be produced.

The general art of powder metal and its processing is succintly outlined by pages 401 to 435 of Vol. 16 of the Encyclopedia of Chemical Technology, Second Edition, published by Interscience Publishers, N.Y., N.Y.

SUMMARY OF THE INVENTION

An object of the present invention is to provide a powder metal method particularly for making an electric contact having cotact and support layers and which meets the previously outlined preferred characteristics for an electric contact suitable for electric power circuit breakers and the like, while avoiding the problems of the prior art methods described hereinabove.

According to this invention, a conventionally unidirectional compacting die of the single action or double action type may be used. Two layers of metal powder are formed in the die cavity, one layer comprising a refractory metal powder or compound, such as powdered tungsten, molybdenum, rhenium, or their alloys, or carbides of these metals or alloys, the other layer comprising a support or impregnating metal powder, such as powdered silver or copper, or alloys of these metals with other metals. The usual punch or punches are then operated to consolidate a coherent two-layer compact that is entirely self-supporting. This compact it placed with its contact layer uppermost and its support layer down with its end resting on a refractory surface profiled to provide a plurality of depressions throughout the area of the support layer's end. This surface may be formed by a ceramic plate which can be moved through a continuous furnace. Thus supported, and while in a non-oxidizing atmosphere or vacuum, the compact is liquid-phase sintered by using a temperature above the melting temperature of the support layer metal but below the sintering temperature of the contact layer metal powder. The support layer metal powder fuses and moves upwardly through the pores of the contact layer portion of the compact, ultimately filling these pores substantially completely and supporting or integrating the powder particles.

When forming the compact, the support metal powder layer volume is proportioned so as to be slightly in excess of the volume required to fill the contact layer pores as described; or in other words, an excess of the support metal powder is deliberately used. Surprisingly, when supported on the refractory surface profiled as indicated, this excess forms a smooth uniformly distributed layer on the bottom of the contact layer, integrally joined to the support metal impregnating the pores of the contact layer and having an external surface with a finish suitable for soldering or welding to another metal part and requiring no postsintering treatment of any kind.

This foregoing summary is brief and does not include many details disclosed hereinafter.

DESCRIPTION OF THE DRAWINGS

The accompanying drawings are schematic and represent in all instances, excepting for FIGS. 3a and 6, vertical sections with the understanding that the parts are circular in cross-section. In these drawings the figures are as follows:

3

Figure 1:
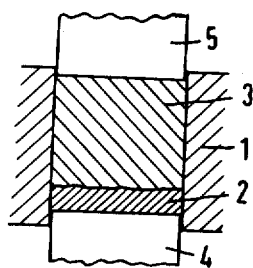
Figure 2:
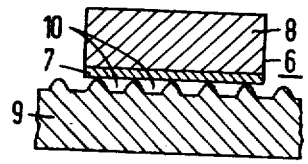

FIG. 1 shows the compacting die and punches producing the two-layer metal powder compact;

FIG. 2 shows the resulting compact with its support layer side down and resting on the profiled refractory surface during the liquid-phase sintering step.

Figures 3, 3A:
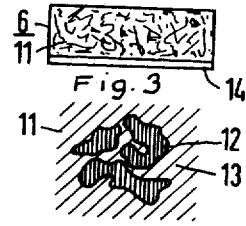

FIG. 3 shows the final contact obtained;

FIG. 3a schematically represents the appearance of the surface of the contact layer when a specimen is polished and examined through a microscope.

Figure 4:
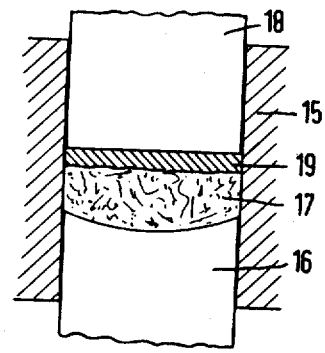
Figure 5:
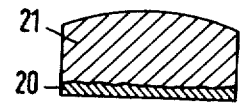
Figure 6:
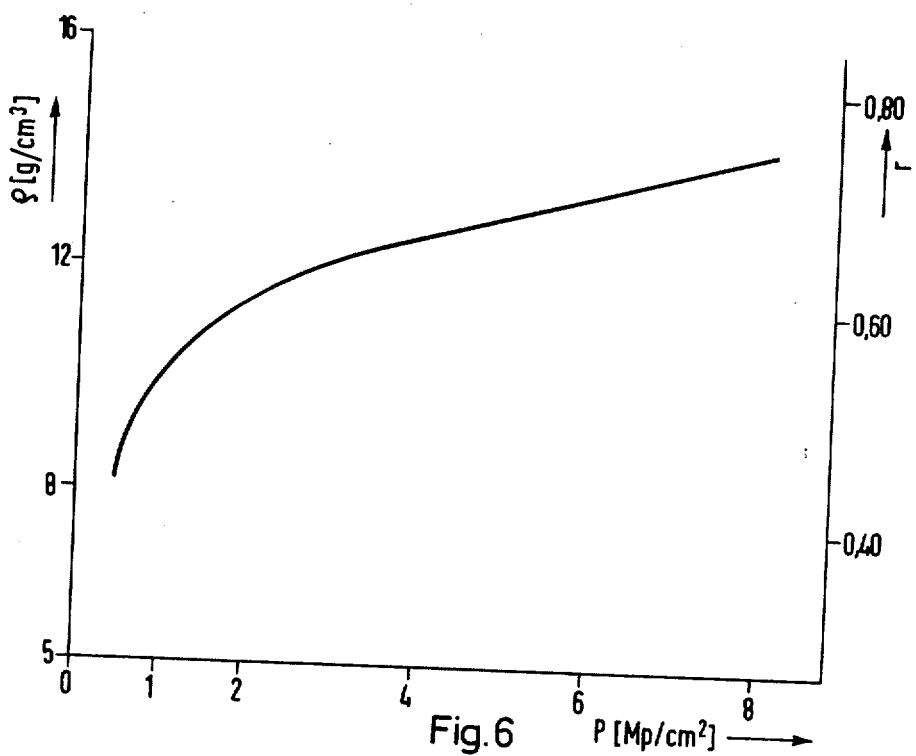
Figure 10:
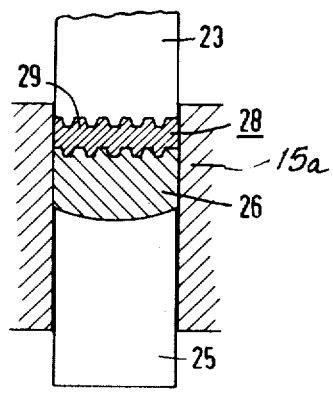
Figure 11:
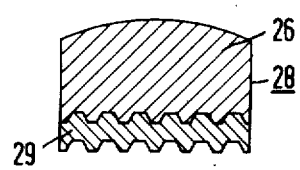
Figure 12:
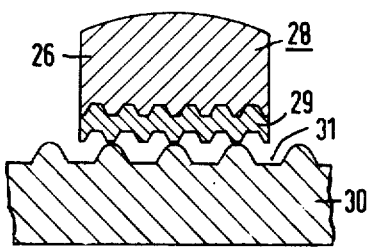

FIG. 4 is a first modification of the procedure shown by FIG. 1;

FIG. 5 shows the finished contact obtained from this modified procedure;

FIG. 6 is a graphic representation of the interrelashinship of the contact metal powder density, the compacting pressure and the filling factor for the contact powder metal layer;

FIGS. 7 through 10 are like FIG. 1, but show progressive steps involved by a second modified practice of the invention;

FIG. 11 shows the compact obtained by the steps represented by FIGS. 7 to 10;

FIG. 12 shows the compact of FIG. 11 ready for the liquid-phase sintering; and

Figure 13:
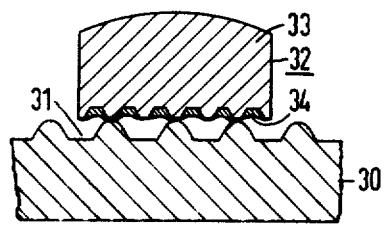

FIG. 13 shows the appearance of this compact shown in FIG. 12 after the sintering step.

DESCRIPTION OF THE PREFERRED EMBODIMENTS

Having reference to FIG. 1, a conventional compacting press may be used having a metal powder compacting die 1 forming a cylindrical cavity in which is first formed a layer 2 of the support metal powder. This may be a copper, silver, or a silver or copper alloy powder. On this layer 2 the metal powder layer 3 is formed for forming the ultimate contact layer, this metal powder being a tungsten, molybdenum or rhenium powder or a mixture of these refractory metal powders, or a refractory alloy of these metals, or a powder carbide, such as tungsten carbide or molybdenum carbide. The layer 3 is, of course, substantially thicker than the layer 2. The metal of the layer 2 has a relatively low melting temperature as compared to the sintering temperatures of the refractory metals of compounds of the layer 3. With the two layers in place, the compacting punches 4 and 5 are operated, either single-action by movement of only one punch or double-action by movement of both, to consolidate the metal powder of the two layers into a coherent and firm two-layer compact. The two layers should adhere reliably for handling of the resulting compact and enough compacting pressure should be used to obtain this adherance.

FIG. 2 shows the resulting integrated layer compact 6 with its support metal layer 7 down and its contact layer 8 extending upwardly, the bottom face or end of the layer 7 resting on a profiled plate 9 made of a suitable refractory, such as a ceramic material. The profile of the upper surface of this plate 9 provides a plurality of uniformly arranged depressions 10, the size and spacing of these depressions relative to the diameter of the compact being such as to provide a multiplicity of depressions for the diametrical extents of the compact. The depressions are uniformly distributed in all directions.

With the compact 6 supported as described above, it is subjected to the liquid-phase sintering under non-oxidizing conditions such as by using an inert gas atmosphere or by using a vacuum furnace. The heating temperature is above the melting temperature of the support metal and below the sintering temperature of the metal powder of the contact layer 8.

During this sintering the metal powder of the compacted support layer 7 melts and moves upwardly through and filling all of the open pores of the compacted contact metal powder 8 of the compact 6. By initially proportioning the layer 2 in FIG. 1 so that its volume is in excess of that required to fill the pores of the compacted layer 8, the excess of the support metal forms a layer of the support metal on the underside of the contact layer 8.

FIG. 3 shows the finished contact. The contact layer 11 now has all of its pores filled with the support metal. As schematically represented by FIG. 3a, if the contact surface is polished and microscopically examined, it is found that the refractory metal or metal compound particles 12 are surrounded by a matrix of the low melting temperature support metal 13 which permanently holds the unsintered particles 12 coherently together. The excess of the support metal forms a layer 14 having a smooth bottom surface requiring no after-treatment to condition it for soldering or welding to a supporting or actuating metal part. The support metal 13 is, of course, solid and inherently integrally joins with the layer 14 of the same metal.

In the foregong manner a finished electric contact is formed by only the two steps represented by FIGS. 1 and 2, respectively. No postsintering treatment is required. The smooth as-melted layer 14 can effectively be soldered or welded to another metal part because it is either silver or copper or their alloys which are inherently solderable and weldable, its surface being free from projections, lumps or the like.

In the above the contact produced has a flat contact surface, the cross-section being circular.

A contact having a spherical surface may be made as illustrated by FIG. 4. In this instance the cavity of the die 15 is provided with a punch 16 having a spherical concave molding surface which corresponds in reverse to the desired spherical contact shape desired. The mold cavity is first loaded with the refractory metal or metal compound powder for the contact layer 17; and, although not illustrated, is precompressed by operation of the upper punch 18 while the lower punch 16 is held stationary. After withdrawing the upper punch 18, the low temperature melting support metal powder 19 is filled in the cavity and both layers then compressed by the upper punch 18 only. The compacting pressure used when compacting the contact layer 17 alone should equal or exceed the subsequent compacting pressure used for the two layers.

Although not illustrated, the compacting surface or end of the punch 18 may be profiled such as by being provided with diamond shaped projections or having a honeycomb shape, and used during both the initial and subsequent compacting, this initially providing the upper surface of the layer 17 with a multiplicity of recesses or depressions which are preserved during the subsequent compacting. The same punch may be used for compacting the two layers together. Assuming proper proportioning of the volume of the layer 19 relative to the pore volume of the layer 17, after the heat treatment under the conditions referred to in connection with FIG. 2, the support layer fills all of the pores of the contact layer 17, with the excess filling mainly the depressions in the contact layer formed by the profiled punch. This avoids possibly heavily coating the peripheral side of the contact with the support layer metal during the liquid-phase sintering, while at the same time providing the contact with a somewhat discontinuously thick solderable layer which, however, provides good solderability with the metal element which must be provided with the contact. For example, with a tungsten-silver contact, having the depressions filled with silver, excellent solderability has been possible. The finished contact with the spherical surface is illustrated by FIG. 5, the support metal layer being shown at 20, and the contact layer of the refractory metal or compound particles filled with the support layer metal, being indicated at 21.

It is to be understood from the foregoing that in filling the die cavity the support metal powder may be filled either before or after the contact metal powder or metal compound is filled. In the case of either of the desired shapes of contact, the punch having the profile surface for making depressions in the contact metal powder layer may be used.

SPECIFIC EXAMPLES OF THE INVENTION

Example 1

For the manufacture of a two-layer contact block with a contact layer of tungsten-silver and a support layer of silver as a finished formed part, the following procedure is followed:

Into the cavity of a die made of the customary materials, for instance steel, is filled with a layer of electrolytic silver powder with a particle size of less than 37 microns, and on top of it a layer of tungsten powder which was obtained by reduction of tungsten trioxide with an average particle size of less than 45 microns. The filling heights of both layers are determined by the desired contact height of the finished part. The two powder layers, filled on top of each other, are jointly compressed to form a two-layer compact with firm edges. The compacting pressure determines the final ratio of the two metals of the contact layer, because with increasing pressure, the pore volume of the tungsten layer decreases. During the heat treatment or liquid-phase sintering at above the melting temperature of the silver (while the formed two-layer body rests with the support or silver layer on the surface of the ceramic plate which is provided with regular depressions, as previously described) the open, accessible pore volume of the contact layer is filled with silver. No appreciable change of the pore volume of the tungsten skeleton of compacted particles occurs during this heat treatment. The tungsten particles are not sintered together. The height of the silver layer is apportioned so that the pore volume of the contact layer is predominantly filled by it and a residual amount remains for a silver layer thickness of 0.1 to 0.5 mm, and preferably 0.2 to 0.3 mm. The heat treatment of the two-layer compact takes place at 1,100°C., above the melting temperature of silver (960°C.) and below the much higher sintering temperature of the tungsten powder, for 1 hour in an $H_2$ atmosphere or in dissociated ammonia gas. For rapid cavity filling, the metal powders used should have good flow properties. In a 60° funnel and a nozzle with a diameter of 4 mm, the flow time should be less than 40 seconds per 100 g. If the initial powders do not possess these flow properties, the powders must be brought into the suitable flow form by known granulating methods.

After the heat treatment, a tungsten-silver two-layer contact block with a silver layer on the support side is obtained, which without further treatment can be joined directly to the carrier metal element by soldering or welding. The structure of the fracture and a polished section through the contact block show a practically poreless structure of tungsten-silver and a second layer of poreless pure silver. The latter is integrally joined with the impregnating silver.

FIG. 6 graphically shows the dependence of the tungsten density on the molding pressure and the filling factor for the compacted tungsten layer. On the abscissa is plotted the molding pressure P in $Mp/cm^2$ (1 $Mp/cm^2$ 1,000 $kg/cm^2$), on the lefthand ordinate the apparent density in $g/cm^3$ and on the right-hand ordinate, the filling factor $r$. The pore volume of the compacted tungsten layer can be calculated directly from the filling factor. The porosity is equal to $100 \times (1 - r)$.

It is the generally accepted opinion of the experts in this field that sintered impregnated contact blocks should be used as free of pores in the contact layer as possible. Measurements of the burn-off in an arc at a maximum current of 350 amperes have shown that with a residual porosity of 5% in the contact layer the burn-off is increased only 10% over the burn-off value of a poreless contact material. Only with a further increase of the residual porosity to 10% is the burn-off doubled. In technical contact materials of tungsten-silver and tungsten-copper, a residual porosity of up to 5% can therefore be present without reduction of the quality of the contact. This small degree of porosity, or less, is possible with this invention.

Example 2

Instead of the tungsten powder layer in Example 1, a layer of molybdenum powder, rhenium powder or nickel powder can be used. Otherwise proceed as in Example 1.

Example 3

Instead of the silver powder layer in Example 1, a layer of copper powder or a layer of a silver or copper alloy powder can be used. Otherwise proceed as in Example 1.

Example 4

For the contact layer, a metal powder mixture of tungsten plus 10% by weight of rhenium is used. The other measures correspond to those of Example 1.

Example 5

For forming the contact layer, a mixture of tungsten powder and nickel powder is used. Because of the electric conductivity, the percentage of nickel is less than 1% by weight, preferably less than 0.2% by weight. Instead of nickel, other metals may be added to the refractory metal powder for improving the wetting ability by the impregnating metal. Otherwise the procedure is as in Example 1.

Example 6

For forming the contact layer, an alloy powder of tungsten-rhenium or tungsten-molybdenum, as solid solutions, is used. The other process steps correspond to those in Example 1.

Example 7

For forming the contact layer, a tungsten carbide powder or molybdenum carbide powder is used, otherwise proceeding as in Example 1.

Example 8

For forming the contact layer, a mixture of tungsten carbide and tungsten powder is used. Otherwise, one proceeds as in Example 1.

In this and the other examples a wetting component can be added to the metal powder for the support layer; for instance, an addition of titanium powder if copper is used.

In FIGS. 7 to 10, the manufacture of a two-layer body by a modification of the foregoing is shown schematically, starting out with the formation of the contact layer.

Figure 7:
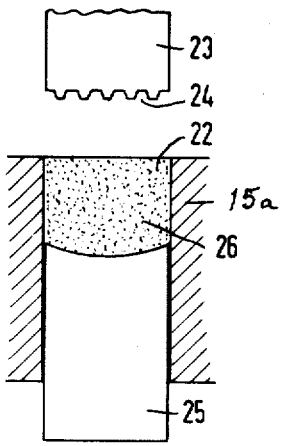
Figure 8:
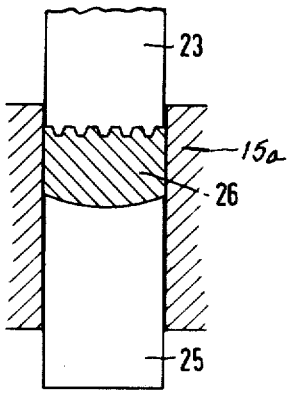
Figure 9:
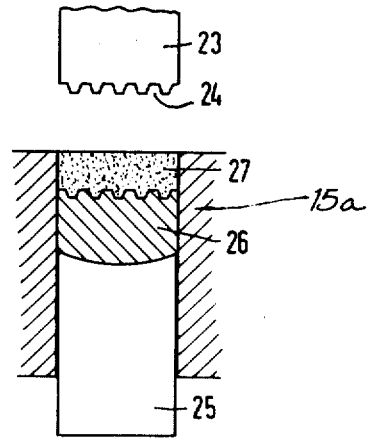

As shown in FIG. 7, a powder layer 22 of the refractory metal powder is filled into the cylindrical cavity of the die 15a. The upper press punch 23 has the profiled molding surface, here illustrated at 24, and the lower press punch has the concave molding surface 25. As is shown in FIG. 8, the powder layer is compressed by the profiled upper punch 23 to form the pressed body 26. Thereupon, a second layer 27 of the powder of the low temperature melting or support metal is filled on top of the pressed body 26, as in FIG. 9. FIG. 10 shows how both layers are compressed by means of the punches 23 and 25 to form a molded two-layer body or compact 28. FIG. 11 shows this two-layer body 28 after ejection from the mold. After this second pressing or compacting operation, the regular depressions are preserved in the contact layer 26 and are filled by the pressed-on metal powder of the low-melting metal of the support metal layer 29. The body 28 is now arranged with its support metal layer 29, as is shown in FIG. 12, on the profiled ceramic plate 20, which has a profiled surface with regular depressions 31 as previously described. After the heat treatment at above the melting temperature of the low-melting support layer but below the sintering temperature of the layer 26, a two-layer contact block is produced, as shown in FIG. 13, as a molded part 32. This part or contact comprises the compacted refractory or contact metal with substantially all of the voids or pores between its particles, filled with the support metal, and which has on the supporting side of the contact block a second layer comprising the support metal 34. The previously described depressions 31 of the ceramic plate 30 result in a uniform distribution of the support metal when melting and impregnation thereby of the porous contact portion 26, with the excess of support metal in the depressions on the underside of the contact.

The following example is to illustrate this modification method further.

Example 9

For the manufacture of a two-layer contact with a contact layer of tungsten-silver and a support layer of silver as a finished molded part, the following procedure is used:

Into a steel die is filled a layer of tungsten powder with a particle size of less than 45 microns, obtained by reduction of tungsten trioxide which is compressed by the upper punch with a honeycomb-like profile at 4 Mp/cm². The compacted tungsten powder body has a density of 12.6 g/cm³, corresponding to a filling factor of 0655 and obtainable by the adequate compacting pressure. The filling space above the pressed tungsten bovy is adjusted so that when a layer of electrolytic silver powder of a particle size of less than 37 microns is filled on top of it, the layer is sufficient for filling the pores of the tungsten powder compacted body and form a layer of 0.3 mm thickness as the support layer.

The two layers are compressed together at 4 Mp/cm² to form a compacted two-layer body. After ejection from the die, the molded body now with firm edges, is placed with the silver layer down on a profiled ceramic plate, whose surface has the described depressions, in this instance in the form of regular, honeycomb-shaped depressions of 2 × 2 mm area and a depth of 0.5 mm. This profile may be used in the other examples. The subsequent heat treatment takes place in hydrogen at 1,100°C. in a push-through or continuous furnace. The average dwelling time in the constant-temperature zone of 1,100°C. is about 60 minutes. After the heat-treated or liquid-phase sintered contact block has cooled, it shows a practically porefree structure in the tungsten-silver contact layer; on the silver support side, the depressions embossed in the contact layer are filled with silver. The thickness of this silver layer is between 0.1 and 0.5 mm. The greatest layer thickness of 0.5 is reached at the deepest points of the depressions and the least thickness being on the heights of the contact layer profile. The surface of the WAg contact layer is coated with a very thin shiny silver layer, having a layer thickness of less than 5 microns.

In the foregoing it has been shown that in all cases the solderable or weldable support layer in its as-melted condition following the heating step, is in a usable condition requiring no finishing operations of any kind. However, this layer is relatively ductile and malleable, being solid silver or copper for example, and it can, therefore, be coined either to provide it with a special surface finish or to provide for even greater dimensional and/or shape precision. Coining is very inexpensive and is adapted for use with high-speed production methods.

What is claimed is:

1. A powder metallurgy method for making a two-layer electric contact or the like, comprising:
  a. providing a first layer of refractory metal or metal compound powder;
  b. providing a second layer of low temperature melting metal powder;
  c. compacting said first and second layers together to form a coherent two-layer compact;
  d. providing a refractory surface having a plurality of depressions on the surface thereof;
  e. supporting said compact with its second layer on said refractory surface with said plurality of depressions therebeneath;
  f. heating said compact under non-oxidizing conditions to a temperature above the melting temperature of said low temperature melting metal to impregnate the pores of said first layer with the metal of said second layer; and
  g. the step of providing said second layer including proportioning said second layer such as to provide said compact with a volume of said low temperature melting metal in excess of the pore volume of said first layer to an extent causing the formation on the latter's bottom of a thin layer of said low temperature melting metal.

2. The method of claim 1 in which said compacting comprises first compacting said layer of refractory metal or metal compound powder by pressing a plurality of depressions in the surface thereof and applying thereto said layer of low temperature melting powder and compacting both layers together, whereby said thin layer fills said depressions with a majority of its volume.

3. The method of claim 1 in which said refractory metal or metal compound is selected from the class consisting essentially of tungsten, molybdenum, rhenium, mixtures or alloys thereof, and carbide compounds thereof, and said low temperature melting metal is selected from the class consisting essentially of silver, copper and alloys thereof.

4. The method of claim 2 in which said refractory metal or metal compound is selected from the class consisting essentially of tungsten, molybdenum, rhenium, mixtures or alloys thereof, and carbide compounds thereof, and said low temperature melting metal is selected from the class consisting essentially of silver, copper and alloys thereof.

* * * * *